United States Patent [19]
Fessel et al.

[11] 3,719,060
[45] March 6, 1973

[54] HIGHLY ELASTIC ANNULAR COUPLER ELEMENT

[75] Inventors: Dietrich Fessel; Heinz Hiersig; Fritz Kinzler, all of Dusseldorf; Werner Russmann, Leverkusen; Helmut Schulz, Witten-Bommern, all of Germany

[73] Assignee: Lohmann & Stalterfoht Aktiengesellschaft, Witten am Ruhr, Germany

[22] Filed: March 11, 1971

[21] Appl. No.: 123,141

[30] Foreign Application Priority Data

March 11, 1970 Germany.....................P 20 12 627.6

[52] U.S. Cl. ..................................64/11 R
[51] Int. Cl...............................F16d 3/16
[58] Field of Search.........54/11 R, 27 NM; 287/85 R

[56] References Cited

UNITED STATES PATENTS

| | | | |
|---|---|---|---|
| 2,802,353 | 8/1957 | Peirce | 64/27 NM |
| 2,822,676 | 2/1958 | Horovitz | 64/11 |
| 2,896,431 | 7/1959 | Stillwagon, Jr. | 64/11 |
| 3,013,828 | 12/1961 | Kleinschmidt | 64/11 X |
| 3,245,229 | 4/1966 | Fadler | 64/27 NM |

*Primary Examiner*—Kenneth W. Sprague
*Attorney*—Smyth, Roston & Pavitt

[57] ABSTRACT

A highly elastic coupling element with inner ring, outer ring of different axial width and rubber insert; the inner ring-rubber insert interface being part conical, part cylindrical, the other interface being essentially conical at similar cone angles. Upon axial displacement of the rings for compensating shrinkage tensile stress, the profile of the insert has rectangular contour, oblique as between the two conical interface portions and integral with a hyperbolically contoured portion of the insert for providing transition between the differently wide rings.

11 Claims, 4 Drawing Figures

PATENTED MAR 6 1973 3,719,060

Inventors:
Dietrich Fessel
Heinz Hiersig
Fritz Kinzler
Werner Russmann
Helmut Schulz By
Ralf H. Siegemund
ATTORNEYS

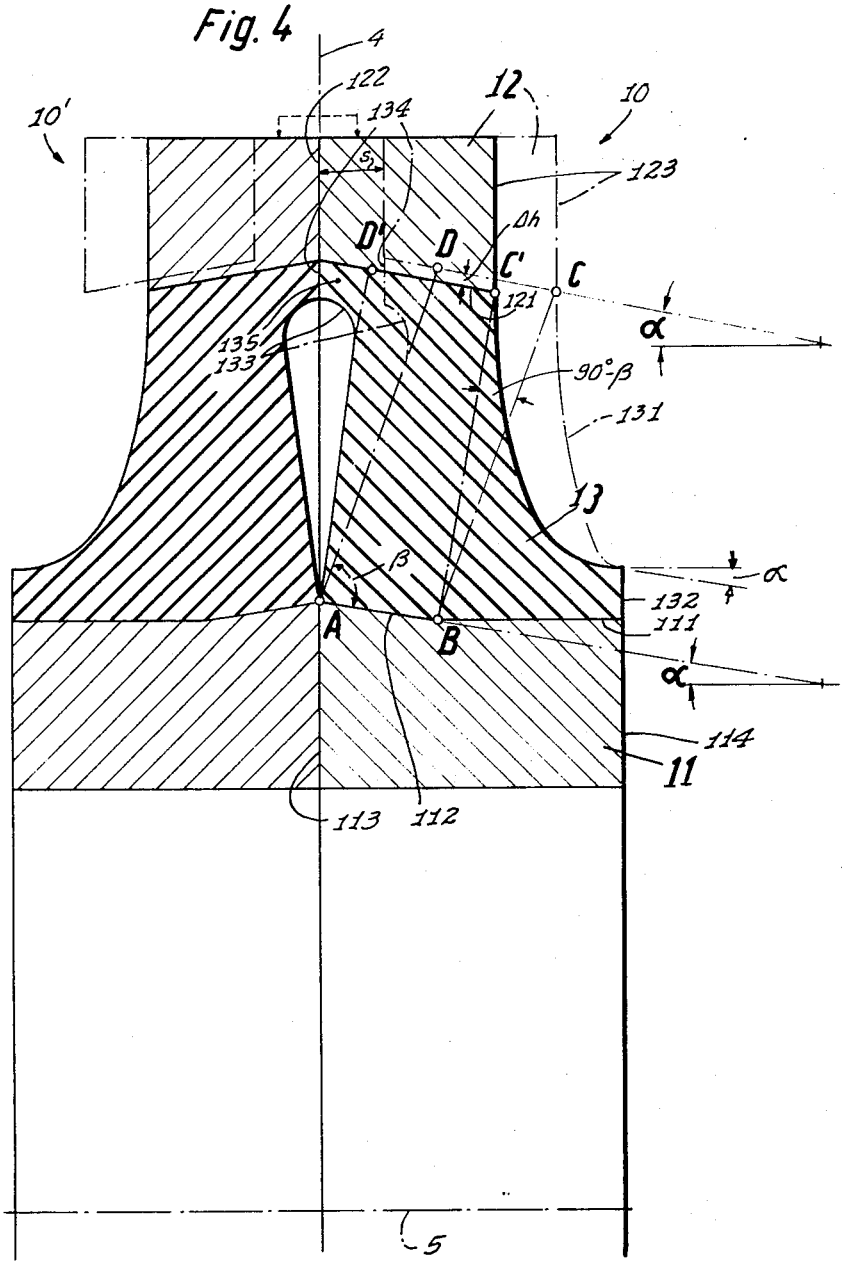

HIGHLY ELASTIC ANNULAR COUPLER ELEMENT

The present invention relates to a highly elastic metal-rubber-metal element for use in shaft couplings or the like, and including a metallic inner ring, a metallic outer ring coaxially surrounding the inner ring, and an annular intermediary layer as connecting element bonded to said two rings.

Such coplanar elements are known generally, for example, from the German Pat. No. 726,369 for use in hinge or articulated joint couplings. The metallic inner and outer rings of such coupling element have substantially spheric metal-rubber interfaces. In order to bring about a ring-shaped recess situated in a radial center plane, the metallic inner and outer rings, as well as the rubber connecting element between them, are divided in the radial center plane. It appears that, due to shrinkage of the rubber in the mold cavity during vulcanization, there will arise tensile stresses, which may considerably affect the durability of such elements.

In order not to let tensile stresses occur in the rubber itself or in normal direction in the rubber-metal interface, these interfaces must be made to approach each other, so that the rubber layer may even be somewhat compressed. Such a compensation can easily be realized by providing for an axial displacement of ring elements with conic interfaces. However, such axial displacement poses additional problems.

A coupling is disclosed in German Pat. No. 1,259,150, in which the metal-rubber interfaces of the metallic inner and outer rings on one hand, and rubber between them on the other hand, are developed as cones, oriented in the same direction. The intermediate rubber layer is divided by one or several "vulcanized-in" intermediate or partitioning metal rings, which are not otherwise connected to the principle inner and outer rings. Upon axial displacement of the outer ring relative to the inner ring, radially acting compression stress occurs as reaction in the divided rubber layer, because in this case the distance between the interfaces, e.g., the area of the parallelogram formed in the cross section of the rubber layer is reduced. The approaching interfaces set up a radially bias in form of compression stress, which may be adjusted, so that radial tensile stress, as having resulted from shrinkage vulcanization is at least offset or compensated.

As rubber is essentially incompressible, external compression forces produce change in shape. However, cross or transverse expansion of the rubber in each element is at any rate prevented by the "vulcanized-in" partitioning rings, and that contributes to increase of radial compression bias. The manufacture of elastic coupling elements, in which the rubber layer is divided by metallic intermediate rings, requires a painstakingly accurate proportioning and distribution of the rubber quantity brought into the mold cavity and to be vulcanized.

In is an object of the present invention to provide a highly elastic coupling element, having two concentric or coaxial metal rings and a resilient element between and interfacing with them, for interconnecting the two rings, and constructed so that stress is permitted to develop in the rubber layer between the coaxial rings without interference from any metallic insert. It is another object of the invention to avoid the difficulties in the vulcanization as resulting from the division of the mold cavity. The shape and manufacture of the resilient element, for example a rubber annulus, is to be as simple as possible, and the metal-rubber interfaces surfaces are to be constituted and arranged relative to one another, so that upon axial displacement of the rings, the cross section of a substantial portion of the rubber layer between the two interfaces, taken in an axial plane, assumes shape that at least approximately resembles a rectangle.

In accordance with the preferred embodiment of the present invention, it was found that for particularly contoured axial cross section of the resilient annular connecting element between two concentric rings, compensation of shrinkage (tensile) stress by developing compression stress can be obtained, while uniform torsional or shear stress is set up in the connecting element under torsional strain, even if the resilient connecting element is not partitioned nor divided by metal ring inserts or otherwise. Instead, the inner ring is to have a (convex) cylindrical surface continuing in a conical surface of increasing diameter; these two surfaces together define one resilient element metal interface. The interface of the resilient element with the (concave) surface of the outer ring, is to be conical also, but at shorter axial length than the interface with the inner ring, the two cone angles involved are to be similar and the annular space between the rings is occupied by a resilient annulus of cross-sectional contour permitting generation of an oblique rectangle when axially biased, the rectangle extending between geneatrices of the two conical interfaces.

It is another feature of the invention that the resilient connecting element viewed in an axial section and when in a state free from external forces, exhibits a profile, which substantially is composed of a parallelogram with an acute angle at the location of the largest diameter of the inner ring, and of an additional area, bounded by one side of the parallelogram and extending therefrom radially inwardly, approximately along a hyperbola. The radially outermost point of the hyperbola has, approximately at least, a tangent that coincides with the one side of the parallelogram thereat, and the (radially) innermost point of the hyperbola intersects a plane in an axial end face of the inner ring at a particular distance therefrom. The hyperbola tangent at the latter point of intersection runs approximately parallel with the generating line of the conical interface of inner ring and resilient annulus.

It is another feature of the invention that the said profile of the resilient element has a still further additional area which is adjacent the parallelogram on the side of the larger diameter of the conical interface with the outer ring. This additional cross section area of the rubber element has contour defined by a straight line extending transverse to the axis (and being the geneatrix of an axial end face annulus), and by a circular arc, which on one end is tangent to and emerges from the one paralleogram side opposite the one tangent to the hyperbola. At its other end, the circular arc is tangent to a straight line running parallel to but at a distance from the interface with the outer ring.

A particularly favorable arrangement for compensating shrinkage by building up of compressive stress is brought about, when, as per the invention, the (similar)

cone angles of inner and outer interfaces and the acute angle of the parallelogram forming the basic profile of the rubber element, are dimensioned so that upon axial displacement of the outer ring relative to the inner ring, the acute angle of the parallelogram has changed into a right angle, while the height of the resulting rectangle, i.e., the distance between the conic interfaces of inner and outer rings is smaller by about 3 percent than the height of parallelogram prior to the axial displacement.

A further characteristic feature of the invention is to be seen in that upon axially biasing the element said parallelogram has changed into a rectangle when the frontal (axial) end faces of inner and outer rungs, situated on the respective side with the larger diameter of the cones lie in one plane.

A particularly advantageous application of the metal-rubber-elements is found when an even number of elements are arranged in a mirror image arrangement, whereby the hyperbolas face away from the plane of symmetry. The outer rings are coupled to each other to obtain mutual axial bias of the rubber elements with a change into rectangles in cross section as defined. Such double elements may be included in double cone friction couplings or in a fixed shaft coupling.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 4 illustrates an axial section view through a novel metal-rubber-metal coupling element constructed in accordance with the preferred embodiment of the invention.

Figure 1:
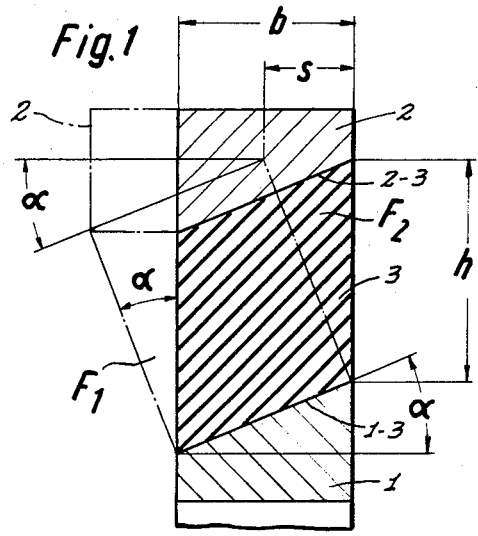
FIG. 1 is an axial section view through a metal-rubber-metal ring element in accordance with a known construction.

Proceeding to the detailed description of the drawings, FIG. 1 illustrates a metallic inner ring 1, a metallic outer ring 2, and a connecting element 3 made of rubber. Partitioning elements have been excluded, otherwise this Figure serves to demonstrate prior art construction as disclosed by German Pat. No. 1,259,150. The two interfaces 1–2 and 2–3 are conical with cone angle $2\alpha$. Outlining without hatching denotes disposition and shape of elements 2 and 3 in the unbiased state, whereby F1 denotes the axial cross section area as taken through element 3. This area is a rectangle having area $b \cdot h/\cos^2\alpha$ where $b$ is the axial length of the elements 1 and 2, and $h$ is the radial distance between them. $h/\cos\alpha$ is the height of the rectangle and denotes actual distance between the two interfaces taken in normal direction through the rubber element 3.

Upon axial displacement of the two elements by a distance $s$, the cross section area is reduced to $F2 = b \cdot h$, and has been distorted to a parallelogram. The relative cross section area reduction is given by $F2/F1 = \cos^2\alpha$. The (normal) distance between the interfaces has changed to $h \cdot \cos\alpha$. That distance is the height of the parallelogram transverse to any of the interface sides thereof. Thus, the ratio of height of the parallelogram to height of the rectangle, is also equal to $\cos^2\alpha$. This represents the relative change in distance between the interfaces and that, in turn, represents geometrically the compression of annulus 3. As was mentioned above, the resulting compression stress may serve to offset tension stress as resulting from shrinkage during the vulcanizing process, but it leads also to transverse changes in shape unless prevented by divider elements which lead to further increase in the compression stress and is regarded as undesirable construction.

Figure 2:
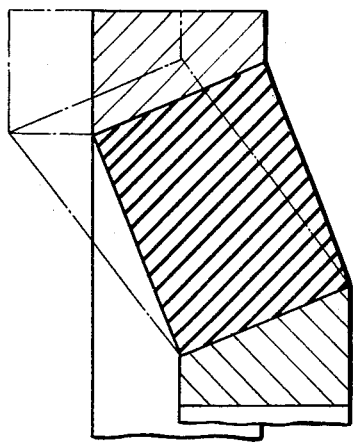
FIGS. 2 and 3 illustrate schematically axial section views used for developing the inventive concept.

As stated, the invention provides construction that obviates the need for dividers and permits the major portion of the axial cross-sectional area of the rubber connecting ring to assume rectangular configuration upon bias. This leads to the basic considerations as depicted in FIG. 2. The greatest effect as resulting from an axial displacement between inner and outer ring is obtained in the area that is located normal between the interfaces. Therefore, optimal use of the rubber element is ensured when the interfaces are axially displaced to an extent only, so that the cross-sectional contour of the rubber element between them forms (i.e. is changed to) a rectangle.

The principal task of such an annular coupler element lies usually in the transmission of torque. Therefore, the torsional stress must be substantially uniform in the ring. This means that the ratio of the width of the interface of rubber element and inner ring, to the width of the interface between rubber element and outer ring is equal to the inverse ratio of the square of the two radii in question, i.e., $(b_i/b_a = r_a^2a/r_i^2)$. Moreover, constant torsional strain in radial direction, requires the axial width of the rubber annulus to change so that width times radius squared remains constant. This leads to a hyperbolic transition boundary of the "flat" sides of the annulus.

Figure 3:
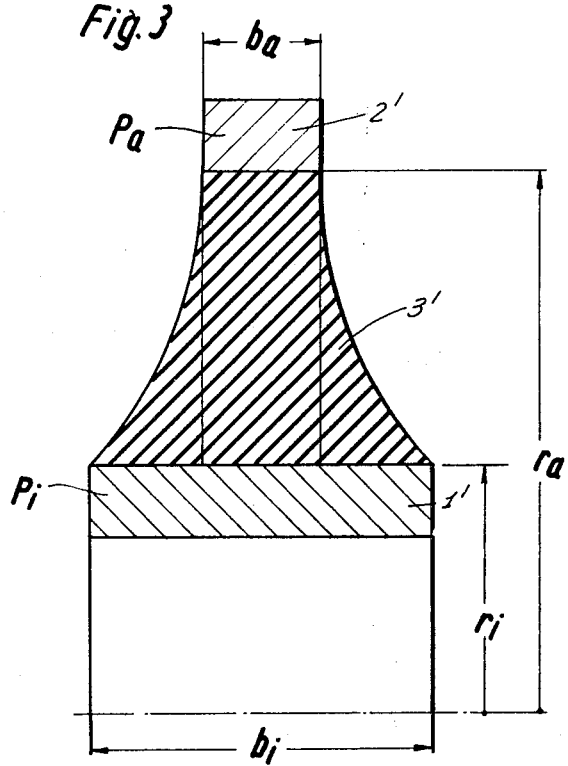

Such a relationship is depicted in FIG. 3, with 1', 2', 3', respectively denoting hypothetical inner ring, outer ring, connecting ring. $bi$ and $ba$ are respectively axial width of cylindrical interfaces of the connecting element 3' with inner and outer rings, and $ri$ and $ra$ are the corresponding radii. The transition follows hyperbolas on both sides.

The negative compression (i.e. tensile stress) in a rubber annulus, arising upon contraction due to shrinkage, is equally large on two interfaces of identical axial width. This rule applies for FIG. 2, it does not apply to a connecting rubber annulus, where the axial length of the two interfaces differ as in FIG. 3, with the hyperbola boundary of the transition. Thus, the requirement of a rectangular cross section between interfaces and of uniform stress distribution through the resilient ring may appear to be contradictory requirements.

In order to meet the requirement for a rectangular cross section of the connecting element as well as for a hyperbolic contour of the cross sections boundary, one could divide the total cross section into several or many intermediate rings, and in such a manner, that several or many flat, i.e., narrow rectangles, are created, which stepwise approximate the hyperbolic line. In thusly "solving" the problem, one must accept several disadvantages, such as a relatively costly construction of such elements, an irregular development of stress and undesirable stiffness in radial direction.

These drawbacks can be prevented when the resilient ring element has a cross section constructed in accordance with the invention and which fulfills the requirement for offsetting and compensation of shrinkage stresses upon generating compressive stresses, while uniformly distributed torsional stress develops under torsional strain in the resilient annulus. With this we turn to the description of the preferred embodiment of the invention as depicted in FIG. 4. There is actually shown a double element; but detailed description of one thereof suffices as they are mirror images of each other, and they are arranged symmetrically. Reference numeral 4 delineates the plane of symmetry, that is a radial plane, transverse to an axis 5.

Each of the two metal-rubber-metal elements, 10 and 10', according to FIG. 4, has a metallic inner ring such as 11, an outer ring such as 12, coaxially surrounding the former (axis 5) and a disk-shaped intermediate ring or annulus 3 made of rubber and serving as connecting element for connecting rings 11 and 12. The connecting annulus 13 is vulcanized onto inner and outer rings and is not divided by metallic intermediate rings. Ring 11 has annular, axial end faces 113 and 114, ring 12 has annular axial end faces 122 and 123.

The metal-rubber interface of bonding inner ring 11 to element 13 includes a cylindrical area 111 continued in a conical-shaped area 112 having cone angle 2 $\alpha$. The metal-rubber interface between outer ring 12 and rubber element 13, is a conical area 121 with the same conic angle. If one views the connecting element 13 in longitudinal, i.e., axial section plane as illustrated, and assuming the element is not biased by any external forces, then ring 12 has position as depicted in dashed lines, i.e., its axial front end annulus 122 is displaced from plane 4 by a distance $s$. End face 113 of ring 11 is in plane 4.

The total cross-sectional area of the connecting element 13 can be regarded as composed of three areas, the division not being a physical one. The first area is a parallelogram delineated by four corner points A, B, C and D. The second area is delineated by the side of parallelogram between corners B and C, by a hyperbolic contour line 131, by interface 111, and by an axial, annular end face 132 of element 13. The third area is small, protrusion-like and is adjacent corner D; it is defined by a circle segment or arc 133, an axial annular face 134 of element 13, a small portion of the side of the parallelogram between points A and D, and by part of interface 121 between point D and end face 134.

Turning now to details of the parallelogram, its four corner points A, B, C and D lie on the respective conic generating lines of the interfaces of inner and outer rings. The points A, B and C are also limit or end points of the cone generating lines, as the interfaces are, strictly speaking, surfaces of frustocones. Thus, a point A is actually the point where the one circular, inner edge of element 11 is intersected by the section plane; point B is on the circle where the cylindrical interface portion 111 joins conical interface portion 112. Point C is in the intersection of the inner circular edge of smallest diameter of element 12, in the section plane. Alternatively, point C can be regarded as the end point of the hyperbola 131. Still a point A, the inner ring 12 has its largest diameter, and the parallelogram has an acute angle $\beta$, i.e., smaller than 90°.

An additional area (second area above) joins the parallelogram at the longitudinal side B–C thereof. The parallelogram side B–C forms approximately the tangent at the hyperbola 131 in point C; i. e., the side B–C of the parallelogram (hypothetical) and the curve 131 (real) intersect in point C at a very small angle (about zero). At the intermost point of hyperbola 131, where intersecting annulus 132, the hyperbolic tangent thereat runs approximately parallel to the geneatrices of the cones as defining the various interfaces. In other words, the tangent of merges hyperbola has approximately angle $\alpha$ relative to a line that (a) runs parallel to axis 5 and (b) is normal on axial end face 132.

The third area portion to be considered joins the parallelogram at the side of the larger diameter of interface 121 and is delineated on the outside by a straight line on annulus 134 (where intersecting the section plane of view), and by circular arc 133. The interface 121 from the circle of largest diameter to point D and the point where arc 133 parallelogram are into (or emerges from) side D–A of the parallelogram are additional delinations of this additional area. This additional area is actually the result of a circular ridge 135 of element 13 extending from the frustocone as defined by the exposed portion of side A–D as geneatrix. This additional area, and particularly its delineations, has the following additional characteristic features.

Circular arc 133 merges at zero angle into the side D–A of the parallelogram, i.e., the latter is a tangent on the circle at the point of intersection. The other end of circle segment 133 has an angle 90°– $\beta$ relative to axial, annular face 134. Or it can be said that the tangent or circle segment 133 where intersecting annulus 134, runs parallel to conical interface 121.

For prestressing or tension biasing the annulus 13, ring 12 is shifted axially by distance $s$, so that its annular end face 122 is coplanar with end face 113 of ring 11, and points C and D become located at C' and D' respectively. The cone angle 2 $\alpha$ of inner and outer interfaces, and the acute angle $\beta$ of the parallelogram ABCD are dimensioned so that upon such particular axial displacement of outer ring 2, the acute angle changes into a right angle, i.e., the parallelogram is distorted into a rectangle.

The height of the parallelogram differs from the height of the rectangle by $\Delta h$. This is the incremental distance by which the distance of the two conical interfaces from each other, taken normal to the cones, differ as before and after axial displacement of ring 12. That incremental distance $\Delta h$ is to be about 3 percent of the height of the parallelogram. Originally, after vulcanization, ring 12 introduces tensile strain into annulus 13 as the annulus shrinks. The reduction in height ($\Delta h$) suffices to produce compression strain so as to offset tensile stress in the annulus 13 as having resulted from shrinkage. In this way one obtains the desired compensation by means of a form and contour of the resilient annulus at considerable simplification when compared with the hitherto known constructions.

One can see also the purpose of the additional area adjacent points D or D', as the rectangle ABC'D' is oblique to the axis, by half of the cone angle, i.e. $\alpha$, the span D' – 134 has to be bridged which is the purpose of this ridge 135.

As a modification of the previously described embodiment, the part of the interface 121 between parallelogram corner D and the edge of axial end face 122, may also be cylindrical. The form of the interface in that particular region is of lesser importance.

In the axial prestressed and tension biased state of element 13, the frontal faces 113 and 122 of the inner and outer rings, 11 and 12 respectively, and as situated on the side of the largest diameter of the interfaces, lie in a common plane such as plane 4. This proves advantageous for a pair-wise arrangement of two elements, as shown in FIG. 4. As the two outer rings of the two elements, 10, 10', are suitably interconnected, the resilient annular elements of each interconnected are mutually biased.

The invention is not limited to the embodiments described above but all changes and modifications thereof not constituting departures from the spirit and scope of the invention are intended to be included.

We claim:

1. A highly elastic coupling element including a first, metallic inner ring, a second, metallic outer ring, coaxially surrounding the first ring and a resilient connecting element between the first and second ring, connected thereto and respectively defining therewith first and second interfaces of bonding, the improvement comprising:

the first interface of bonding being a cylindrical surface which is continued in a conical surface area of increasing radius, the second interface of bonding being at least substantially a conical surface area, the conical surfaces of the first and second interfaces having similar cone angles oriented in similar axial direction.

2. Coupling element as in claim 1, the axial length of the first interface being larger than the axial length of the second interface.

3. Coupling element as in claim 2, the ring-shaped connecting element in the unbiased state (tensile strain) having cross section in an axial plane essentially in form of a parallelogram having an acute angle at largest cone circle and radius of the first interface, and with an additional area along one side of the parallelogram having a hyperbola as boundary to obtain transition as to the differing axial lengths.

4. Coupling element as in claim 3, the hyperbola being tangent to the one side of the parallelogram at point of smallest radius of the second, conical interface, the inner ring having an axial end face defining an axial plane, the hyperbola intersecting that plane at a distance from the first interface and at angle of approximately half the cone angle.

5. Coupling element as in claim 3, the profile having a second additional area on the side opposite said side of the parallelogram bounded by a line in an axial plane and by a circular arc merging with the said opposite side and intersecting that line at a point where a tangent on the circle runs parallel to the cone.

6. Coupling element as in claim 3, the cone angle and said acute angle selected so that upon an axial displacement of the first and second rings relative to each other, as the acute angle changes to a right angle, the first and second interfaces are apart (as measured transverse to either interface) by a distance smaller by 3 percent than the height of the parallelogram in the axially unbiased state of the resilient element.

7. Coupling element as in claim 3, the connecting element affixed to the first and second rings, so that upon axial displacement of the first and second rings one end face each of the rings are coplanar, when the parallelogram has changed into a rectangle.

8. Coupling element as in claim 2, the connecting element having cross section profile so that upon particular axial displacement a span from the entire, conical surface portion of the first interface, normal thereto, to the conical surface of the second interfaced is filled with material at substantially no stress normal to said surfaces.

9. Coupling element as in claim 1, the connecting element having cross-sectional profile, the area thereof outlined as follows, a first straight line as geneatrix on the cone of the first interface, a second straight line at an acute angle thereto, a circular are emerging tangentially from the second line, a relatively short third straight line transverse to the axis, a fourth straight line as geneatrix of the cone of the second interface, a hyperbola at an angle to the fourth straight line equal to the acute angle, a relatively short fifth straight line intersecting the hyperbola at an angle about 90° minus the cone angle, and a sixth straight line as geneatrix on the cylinder surface merging into the first straight line.

10. Coupling element as in claim 9, connected to a second coupling element of similar construction and connected thereto so that one pair of axial end faces of the respective first and second rings are coplanar, thereby tension biasing the respective connecting elements so that said acute angle has changed to a right angle.

11. Coupling element as in claim 1, in cooperation with a second coupling element of similar construction, the two elements arranged in mirror image symmetry to a plane transverse to a common axis, the coupling elements interconnected to obtain mutual axial tension bias of the respective resilient connecting element.

* * * * *